US011093538B2

(12) United States Patent
Aravamudan et al.

(10) Patent No.: US 11,093,538 B2
(45) Date of Patent: *Aug. 17, 2021

(54) DISAMBIGUATING USER INTENT IN CONVERSATIONAL INTERACTION SYSTEM FOR LARGE CORPUS INFORMATION RETRIEVAL

(71) Applicant: Veveo, Inc., Andover, MA (US)

(72) Inventors: Murali Aravamudan, Andover, MA (US); Rakesh Barve, Bangalore (IN); Sashikumar Venkataraman, Andover, MA (US); Vineet Agarwal, Andover, MA (US); Abhijit Savarkar, Andover, MA (US); Ganesh Ramamoorthy, Andover, MA (US); Ahmed Nizam Mohaideen Pathurudeen, Kovilpatti (IN); K China Srinivasulu Reddy, Marathalli (IN)

(73) Assignee: Veveo, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,413

(22) Filed: Jan. 15, 2020

(65) Prior Publication Data

US 2020/0167376 A1 May 28, 2020

Related U.S. Application Data

(63) Continuation of application No. 15/277,288, filed on Sep. 27, 2016, now Pat. No. 10,572,520, which is a
(Continued)

(51) Int. Cl.
*G06F 16/335* (2019.01)
*G06F 16/24* (2019.01)
(Continued)

(52) U.S. Cl.
CPC ............ *G06F 16/335* (2019.01); *G06F 16/24* (2019.01); *G06F 16/3322* (2019.01);
(Continued)

(58) Field of Classification Search
CPC .............. G06F 16/335; G06F 16/3322; G06F 16/3328; G06F 16/367; G06F 16/90324; G06F 16/24
(Continued)

(56) References Cited

U.S. PATENT DOCUMENTS 4,138,719 A 2/1979 Swanstrom et al.
4,509,133 A 4/1985 Monbaron
(Continued)

FOREIGN PATENT DOCUMENTS

JP H06266779 9/1994
JP H09146972 6/1997
(Continued)

OTHER PUBLICATIONS

Kumar et al., "Reference resolution as a facilitating process towards robust multimodal dialogue management: A cognitive grammar approach, International Symposium on Reference Resolution and its Application to Question Answering and Summarization," Jan. 1, 2003 (8 pages).

*Primary Examiner* — Robert W Beausoliel, Jr.
*Assistant Examiner* — Pedro J Santos
(74) *Attorney, Agent, or Firm* — Haley Guiliano LLP

(57) ABSTRACT

A method of disambiguating user intent in conversational interactions for information retrieval is disclosed. The method includes providing access to a set of content items with metadata describing the content items and providing access to structural knowledge showing semantic relationships and links among the content items. The method further includes providing a user preference signature, receiving a
(Continued)

Conversation Interaction Architecture first input from the user that is intended by the user to identify at least one desired content item, and determining an ambiguity index of the first input. If the ambiguity index is high, the method determines a query input based on the first input and at least one of the structural knowledge, the user preference signature, a location of the user, and the time of the first input and selects a content item based on comparing the query input and the metadata associated with the content item.

20 Claims, 4 Drawing Sheets

Related U.S. Application Data continuation of application No. 13/801,812, filed on Mar. 13, 2013, now Pat. No. 9,465,833.

(60) Provisional application No. 61/677,895, filed on Jul. 31, 2012.

(51) Int. Cl.
  *G06F 16/36* (2019.01)
  *G06F 16/332* (2019.01)
  *G06F 16/9032* (2019.01)

(52) U.S. Cl.
  CPC ........ *G06F 16/3328* (2019.01); *G06F 16/367* (2019.01); *G06F 16/90324* (2019.01)

(58) Field of Classification Search
  USPC .......... 707/999.003, E17.108, 748, E17.109, 707/E17.102, 741, 752
  See application file for complete search history.

(56) References Cited

U.S. PATENT DOCUMENTS

| | | | |
|---|---|---|---|
| 5,859,972 A | 1/1999 | Subramaniam et al. | |
| 6,044,347 A | 3/2000 | Abella | |
| 6,064,960 A | 5/2000 | Bellegarda | |
| 6,144,958 A | 11/2000 | Ortega | |
| 6,195,635 B1 | 2/2001 | Wright | |
| 6,236,968 B1 | 5/2001 | Kanevsky | |
| 6,256,664 B1 | 7/2001 | Donoho | |
| 6,317,708 B1 | 11/2001 | Witbrock et al. | |
| 6,408,293 B1 | 6/2002 | Aggarwal et al. | |
| 6,901,366 B1 | 5/2005 | Kuhn | |
| 7,143,078 B2 | 11/2006 | Doherty | |
| 7,668,865 B2 | 2/2010 | McDonald | |
| 7,835,998 B2 * | 11/2010 | Aravamudan ........ G06F 16/248 706/11 |
| 7,912,701 B1 | 3/2011 | Gray et al. | |
| 7,937,272 B2 | 5/2011 | Oomen | |
| 8,156,129 B2 | 4/2012 | Zhou | |
| 8,315,849 B1 | 4/2012 | Gattani | |
| 8,504,562 B1 | 8/2013 | Ikeda | |
| 8,554,540 B2 | 10/2013 | Lee | |
| 8,880,423 B2 | 11/2014 | Zhang | |
| 8,903,793 B2 | 12/2014 | Bangalore | |
| 8,954,318 B2 | 2/2015 | Barve | |
| 9,009,046 B1 | 4/2015 | Stewart | |
| 9,183,183 B2 | 11/2015 | Barve | |
| 9,251,225 B2 | 2/2016 | Stanfill | |
| 9,424,233 B2 | 8/2016 | Barve | |
| 9,465,833 B2 | 10/2016 | Aravamudan | |
| 9,477,643 B2 | 10/2016 | Barve | |
| 9,542,482 B1 | 1/2017 | Sachan | |
| 10,341,447 B2 | 7/2019 | Kelly | |
| 10,482,674 B1 | 11/2019 | Wu et al. | |
| 2002/0065813 A1 | 5/2002 | Scanlon et al. | |
| 2002/0065884 A1 | 5/2002 | Donoho | |
| 2003/0069879 A1 | 4/2003 | Sloan et al. | |
| 2003/0101047 A1 | 5/2003 | Panttaja | |
| 2003/0101286 A1 | 5/2003 | Kolluri | |
| 2003/0216912 A1 | 11/2003 | Chino | |
| 2004/0019588 A1 | 1/2004 | Doganata | |
| 2004/0194141 A1 | 9/2004 | Sanders | |
| 2005/0049852 A1 | 3/2005 | Chao | |
| 2005/0055321 A1 | 3/2005 | Fratkina | |
| 2006/0074661 A1 | 4/2006 | Takaichi | |
| 2006/0074870 A1 | 4/2006 | Brill et al. | |
| 2006/0282776 A1 | 12/2006 | Farmer | |
| 2007/0043574 A1 | 2/2007 | Coffman | |
| 2007/0073540 A1 | 3/2007 | Hirakawa | |
| 2007/0078815 A1 | 4/2007 | Weng | |
| 2007/0192101 A1 | 8/2007 | Braho | |
| 2007/0225980 A1 | 9/2007 | Sumita | |
| 2008/0010352 A1 | 1/2008 | Donoho | |
| 2008/0120072 A1 | 5/2008 | Bartz | |
| 2008/0120093 A1 | 5/2008 | Izumida | |
| 2008/0155701 A1 | 6/2008 | Marinez | |
| 2008/0221866 A1 | 9/2008 | Katragadda | |
| 2008/0235202 A1 | 9/2008 | Wang et al. | |
| 2009/0144609 A1 | 6/2009 | Liang et al. | |
| 2009/0210232 A1 | 8/2009 | Sanchez | |
| 2009/0276396 A1 | 11/2009 | Gorman | |
| 2009/0281923 A1 | 11/2009 | Selinger | |
| 2009/0282333 A1 | 11/2009 | Olsen et al. | |
| 2010/0049684 A1 * | 2/2010 | Adriaansen ........... G06F 40/117 706/46 |
| 2010/0153885 A1 | 6/2010 | Yates | |
| 2010/0185649 A1 | 7/2010 | Zhou | |
| 2011/0066643 A1 | 3/2011 | Cooper et al. | |
| 2011/0066644 A1 | 3/2011 | Cooper et al. | |
| 2011/0066645 A1 | 3/2011 | Cooper et al. | |
| 2011/0119282 A1 | 5/2011 | Gorman | |
| 2011/0145224 A1 | 5/2011 | Bangalore | |
| 2011/0179440 A1 | 7/2011 | Safaipour | |
| 2011/0209047 A1 | 8/2011 | Olsen et al. | |
| 2012/0124071 A1 | 5/2012 | Gebhard | |
| 2012/0310622 A1 | 12/2012 | Zivkovic et al. | |
| 2013/0054245 A1 | 2/2013 | Chang | |
| 2013/0185368 A1 | 7/2013 | Nordstrom | |
| 2013/0297285 A1 | 11/2013 | Kwon | |
| 2014/0214401 A1 | 7/2014 | Li | |
| 2014/0223481 A1 | 8/2014 | Fundament | |
| 2014/0297666 A1 | 10/2014 | Morris | |
| 2014/0337370 A1 | 11/2014 | Aravamudan | |
| 2014/0337381 A1 | 11/2014 | Aravamudan | |
| 2015/0081656 A1 | 3/2015 | Wang | |
| 2016/0179801 A1 | 6/2016 | Venkataraman | |
| 2016/0226984 A1 | 8/2016 | Christensen | |
| 2016/0227283 A1 | 8/2016 | Christensen | |
| 2016/0342702 A1 | 11/2016 | Barve | |
| 2016/0351187 A1 | 12/2016 | Dandekar et al. | |
| 2017/0004184 A1 | 1/2017 | Jain | |
| 2017/0017719 A1 | 1/2017 | Aravamudan | |
| 2017/0060855 A1 | 3/2017 | Song et al. | |
| 2017/0140405 A1 | 5/2017 | Gottemukkala et al. | |
| 2018/0225013 A1 | 8/2018 | Barrett | |
| 2018/0226073 A1 | 8/2018 | Hodge et al. | |
| 2018/0260445 A1 | 9/2018 | Aravamudan | |
| 2018/0308202 A1 | 10/2018 | Appu | |
| 2018/0342174 A1 | 11/2018 | Zhang et al. | |
| 2018/0349755 A1 | 12/2018 | Gao | |
| 2019/0051317 A1 | 2/2019 | Aravamudan | |
| 2019/0108447 A1 | 4/2019 | Kounavis | |
| 2019/0179861 A1 | 6/2019 | Goldenstein | |
| 2019/0197357 A1 | 6/2019 | Anderson | |
| 2019/0295211 A1 | 9/2019 | Appu | |
| 2019/0318648 A1 | 10/2019 | Zhang et al. | |
| 2019/0335007 A1 | 10/2019 | Kelly | |
| 2020/0279019 A1 | 9/2020 | Peterson et al. | |
| 2020/0351361 A1 | 11/2020 | Kelly et al. | |
| 2020/0372117 A1 | 11/2020 | Han et al. | |

FOREIGN PATENT DOCUMENTS

| | | |
|---|---|---|
| JP | 2001-034292 | 2/2001 |
| JP | 2001043246 | 2/2001 |
| JP | 2001-100787 | 4/2001 |

(56) References Cited

FOREIGN PATENT DOCUMENTS

| | | |
|---|---|---|
| JP | 2001-175680 | 6/2001 |
| JP | 2002-108915 | 4/2002 |
| JP | 2003-058538 | 2/2003 |
| JP | 2004-362280 | 12/2004 |
| JP | 2006-107469 | 4/2006 |
| JP | 2007-511016 | 4/2007 |
| JP | 2008-243047 | 10/2008 |
| JP | 2009-037603 | 2/2009 |
| JP | 2010-205265 | 9/2010 |
| KR | 101322821 B1 | 10/2013 |
| WO | WO 1998013771 | 4/1998 |
| WO | WO 2007103938 | 9/2007 |
| WO | WO 2011088053 | 7/2011 |
| WO | WO 2002073331 | 9/2012 |

\* cited by examiner

Crawling accumulating and creating a Deduplicated base UST

The three stages of an always evolving, improving UST system

Some of the UST records connected to Beethoven

DISAMBIGUATING USER INTENT IN CONVERSATIONAL INTERACTION SYSTEM FOR LARGE CORPUS INFORMATION RETRIEVAL

CROSS-REFERENCE TO RELATED APPLICATIONS

This application is a continuation of U.S. patent application Ser. No. 15/277,288, filed Sep. 27, 2016, which is a continuation of U.S. patent application Ser. No. 13/801,812, filed Mar. 13, 2013, now U.S. Pat. No. 9,465,833, which claims the benefit under 35 U.S. C. § 119(e) to U.S. Provisional Patent Application No. 61/677,895, filed on Jul. 31, 2012, each of which is hereby incorporated by reference herein in its entirety.

BACKGROUND OF THE INVENTION

Field of Invention

The present invention relates to a method for disambiguating user intent in conversational interaction system for information retrieval, and more specifically, related to techniques of using structural information and user preferences.

Brief Description of Related Art and Context of the Invention

The present invention relates to a method for "optimally" and "intelligently" disambiguating user intent/input in a conversational interaction system for large corpus information retrieval where the intent/input has one or more of the following ambiguities (1) lexical ambiguity (multiple qualifying responses lexically matching user input) or (2) semantic ambiguity where the ambiguity is in time (multiple qualifying responses based on temporal attribute), or ambiguity is in location (multiple qualifying responses based on location attribute), or ambiguity is in any content attribute or combination of content attributes (multiple qualifying responses based on the content attribute/attributes specified by user) or just ambiguity arising out of non-specificity inherent in user's request (e.g. a broad intent request) which in turn results in multiple qualifying responses. Implementations of the "optimal" disambiguation method described in the present disclosure enables the system to ask the minimum number of clarifying questions (in the ideal case, not asking any question at all) to understand user intent. Implementations of the "intelligent" disambiguation method described in the present disclosure enable the system to make a disambiguation exchange natural, similar to the way humans clarify an ambiguity in a conversation. The system makes use of domain specific structural knowledge, time, location of user (if available), and signature of user preferences (if available) to perform optimal and intelligent disambiguation. The methods described in the present disclosure are language independent and can be applied to multiple languages, with the support of a language specific module. Furthermore, the methods disclosed herein are especially suited for large corpus information repositories with high semantic ambiguity and conflict caused by the fact that a given entity or concept of the repository may be referred in many ways and the same term may appear in the context of different meanings.

The key performance metric of a conversational system is not how well its response matches user intent when user intent/input is unambiguous, but how it responds when the user's intent/input has ambiguity. A good conversational system does not have, in its repertoire of possible response strategies, the luxury of spewing out a multitude of responses, like a search engine would spew results, even if there is ambiguity in user input/intent. For a search engine, showing all results for ambiguous input/intent, in some order of relevance, would be extolled as the hallmark of a good search engine. Adopting the same approach for ambiguous user input/intent in a conversational system, would be equivalent to the bewildering encounter in Starbucks with an overzealous sales person, who reels off ten coffee choices, just because user absent-mindedly failed to qualify the particular kind of coffee (e.g. Caffè Latte) user had in mind. Here, even though the salesperson clearly understood the intent was coffee (and not tea), the salesperson was not mindful of the fact that there are many choices matching the intent—a more savvy salesperson would have probably said "Oh there are many choices of coffee, would you like me to give you a quick run-down of your choices?"

The present disclosure uses the term "ambiguity" in a broad sense to capture the scenario when there are multiple qualifying responses (with one exception mentioned below) matching user input. One example of the meanings of the term "ambiguous" as used in this disclosure can be understood from the following examples: While a good conversational system would strive to understand user intent and generate the most succinct targeted response which, depending on the question, may ideally be just one succinct response (e.g. the question "is sox playing tonight?" could generate a response just showing time and location of the red sox game, where red sox was inferred from user's signature), it does not necessarily imply all user questions generate a single response. Neither is it implied offering multiple choices to a question would be sub-optimal. For instance, if a user states "show me Starbucks nearby", the best response would be the display of a map plotted with all Starbuck results close to the user, so user can pick any one effortlessly from the visual map. Even for a broader intent request such as "Show me restaurants nearby," displaying multiple responses on a map is the best response a system can provide.

The intent is clear in both these cases—but the response is in a sense "ambiguous", because its more than one—system does not know which particular restaurant user may like. Though if there is a signature of user preferences, it could generate a response with the most preferred Starbucks/restaurant highlighted from the other responses. The multiple responses in these cases mentioned above are not really ambiguous responses, but a palette of "choices" that all match user intent (granted user may still not choose a Starbucks or a restaurant, for subjective reasons). The word "choices" is used here to distinguish from "responses", to show that user intended multiple choices—not just one choice (even if system had signature of user preferences, it would still offer multiple "choices"). Another example is— "show me movies of Meryl Streep." In this case, user wanted multiple movies of Meryl Streep to "choose" from.

The methods described in the present disclosure focus on the cases where the ambiguity (or multiple qualifying responses) stems from the inability to offer one clear "choice" or a palette of "choices" that can be known, with a good degree of confidence, to match user intent. Furthermore, when the user intended a particular choice or choices, the burden is on the system, despite lexical and/or semantic ambiguity to pick that particular choice or choice set. This ambiguity is not due to the deficiency or "lack of intelligence" of the system, but due to the inherent ambiguity (lexical or semantic) in the very question posed by the user.

The methods described in the present disclosure focus on the disambiguation method for these ambiguous cases where it is not possible to offer a set of choices due to inherent ambiguity in user intent/input. The Starbucks/restaurant and the "Meryl Streep" responses are best case scenarios, with no need for ambiguity resolution. The system responses are just as good as the succinct response to the question "is there a sox game tonight" mentioned above—the multiple responses are "choices" and not ambiguity in response.

The word "ambiguity" is also used in the present disclosure to handle an exception case—when there are no responses at all matching user intent/input. In this boundary condition, the ambiguity could be due to a variety of reasons ranging from user not expressing intent correctly or just that there is no match in the information domain spaces. For instance, if user asked "is there a sox game tonight", and there isn't any sox game, then that is a case where there is nothing to match user's intent of wanting to watch a game.

From a strict request/response there is no ambiguity here. But in human interactions, when user expresses an intent that cannot be satisfied, a reasonable question arises "can I offer user something that could come close to satisfying original intent?" Typically, a response that offers a close alternative is often appreciated. In the case of the "is there a sox game tonight", a response "there isn't one tonight, but there was a game last night that you missed" (this response can be created using signature of user' preferences and past history). Embodiments of the present invention treat this case of no responses as "a null response ambiguity" case, and generate responses that are a best effort to get closer to satisfying user intent. Another example is, "Did X and Y act together in a play?" Assuming X and Y never acted together in a play, implementations of the present invention would make use of domain specific structural knowledge to generate "No, they didn't act together in a play, but they did star together in a movie Z, back in 1989". Here the domain specific structural knowledge is used to generate a response to a "null response ambiguity" case.

Most of the examples of ambiguity described in the present disclosure are based on the digital entertainment space predominantly. However, the methods described in the present disclosure can apply to any information verticals (entertainment, personal corpus such email, contacts etc.), and also across different information verticals.

The ambiguity in user intent/input could be of different kinds. One possibility is lexical ambiguity in user input, but user had clear intent. For instance, assume user says "I would like to watch the Beethoven movie". Three movies qualify for "Beethoven movie"—1936 film about the composer Beethoven, a 1992 film about a dog named Beethoven, or a famous movie in 1994 about Beethoven, "Immortal Beloved". User's intent was clearly just one of these movies (based on the use of "the" in the request), but user's input lexically matched three qualifying responses. A good conversational system would never offer, in this case, these three qualifying responses as three equally valid choices for user to pick one from. Such a system would be a conversation system whose performance has degenerated to a search engine performance offering results—it will be apparent the system has no internal understanding of the term Beethoven, other than perhaps some relevance metric.

A conversational system that strives to inch closer to conversations between humans, would ask the user "Do you mean movie about the composer or the movie about the dog?"—much like a human would respond in a conversation. The disambiguating question itself is an indicator that the conversational system understands the term Beethoven, more like a human being does. For instance, the same disambiguating question could have been framed "Do you mean Beethoven the composer or Beethoven the dog?" While this is still a good disambiguating response, the previous response is closer to normal speech, where the very term that is ambiguous, namely Beethoven, is dropped from the disambiguating response to user. In summary, a good conversational system would be particularly sensitive in its response to lexical ambiguity and generate disambiguating responses that are more human like, since such a response is a key metric in deciding the caliber of the system where the scale could range from "a search engine intelligence" to a "natural conversation intelligence".

Another form of ambiguity is semantic ambiguity in time or linear continuity. If user says "I would like to watch Borghia" (a TV series), there is an ambiguity in the season user wants to watch, though the current season would be considered a reasonable response in most cases. However, if user had been watching the series from the first season, then ideally the season following the one last watched would be ideal. This form of ambiguity can also arise when user is in the process of watching a sequential series of content (like David Attenborough's nature series "Life on earth"). The resolution of the ambiguity in that case is ideally resolved by also starting with the episode user last viewed. In either of the cases (seasons or linear series) if user had not been watching in temporal or linear sequence, then a disambiguating question is inevitable. However, if user said "I would like to watch the next Borghia", then the user intent could be interpreted to mean the episode following the one user last watched.

Another form of ambiguity is ambiguity in location resulting in multiple qualifying responses. For instance, the request, "Show me the Spielberg movie shot in Hawaii," would result in the multiple movies Jurassic Park and its sequels—Lost world, and Jurassic Park III—all shot in locations in Hawaii. User intended only one here by asking for "the Spielberg movie". A response that is closer to a human response would be "Jurassic park was shot in Hawaii. Its sequels "Lost World" and "Jurassic Park III" were shot there too.

In another example, if user asks "is there a tiger's game tonight", user could have meant the Detroit Tigers baseball team or the Louisiana Tigers football team (Louisiana Tigers football team is more popular than the baseball team with the same name). However, if the user's location is known to be in Louisiana, it is most likely user meant Louisiana football team. However, if user's location is known to be in Detroit, then the question could map to the Detroit baseball team. In the event user is travelling and the location is not known, then there is an ambiguity in the question that needs to be resolved, particularly when there is no prior information about user's preference to either one of these teams. Furthermore, if the question was posed during the game season, then that could be a disambiguating factor too, in addition to location. In general, there could be ambiguity in any attribute specified by user, not just location and time—the examples above show ambiguity in attributes such as location and time.

There could also be ambiguity in understanding user intent, from the very broadness of intent. For instance, if user says, "I would like to watch a movie tonight", even if signature of user preferences are known, user may be interested in action or mystery movies. So there is still an ambiguity between these two genre types that needs to be resolved. A disambiguation scheme used in some existing conversational systems is to walk user down a multilevel decision tree posing questions to user to narrow down the choice. This "algorithmic tree walk approach" is never done by humans in a natural conversation, making that strategy unacceptable for a conversational system that strives to be close to natural conversations. Such a multilevel decision tree walk may be acceptable to some degree for some domains such as an airline reservation process, but it would look comically silly when applied in certain domains such as entertainment space.

Ambiguity could also arise from errors in inputting user's intent, where the input could be speech or text input. Those errors are deemed, for the purposes of the methods described in this disclosure, lexical errors (though a lexical error may actually result in a semantic difference in some cases). Resolution of ambiguity described in the present disclosure leverages off domain specific structural knowledge, signature of user preferences (if available), user's location (if available) and time. However, clearly not all ambiguities are resolvable as seen in the examples above.

To summarize, the ambiguity in user input/intent may lead to qualifying responses (with the exception of "null response" case) that can be loosely correlated with each other as would be the case of lexical ambiguity (e.g. Beethoven the movie may match the movie about the musician or about a dog named Beethoven). In the other extreme, ambiguity in user input/intent may lead to qualifying responses that can be closely correlated with each other to the extent that the multiple responses are more like "choices"—all closely correlated, and with a high degree of probability of matching user intent (e.g. the responses to "show me Starbucks close by"). Furthermore, when the user intent is broad, the qualifying responses are potentially quite large, necessitating a disambiguating response to user. Embodiments of the conversational system described in the present invention respond to user in a conversation based on the nature of the ambiguity (lexical or semantic ambiguity) and the degree of correlation of qualifying responses with each other, by making use of domain specific structural knowledge, time, location of user (if available) and signature of user preferences (if available). The conversation exchange that ensues to disambiguate user intent strives to approach the ideal goal of the fluidity of human conversations where disambiguation is woven seamlessly into the very fabric of the exchanges, and doesn't interrupt the seamless flow by standing out because of artifacts of its machine generated origin. Embodiments of the conversational system described in the present disclosure also address the "null response ambiguity" case so user is not left in a dead end with an unfulfilled intent.

SUMMARY OF THE INVENTION

A method of disambiguating user intent in conversational interactions for information retrieval is provided. The method includes providing access to a set of content items. Each of the content items is associated with metadata that describes the corresponding content items. The method also includes providing access to structural knowledge that shows semantic relationships and links among the content items and providing a user preference signature that describes preferences of a user for at least one of (i) particular content items and (ii) metadata associated with the content items. The method further includes receiving a first input from the user. The first input is intended by the user to identify at least one desired content item. The method also includes determining an ambiguity index of the first input. The method includes, upon a condition in which the ambiguity index exceeds a first threshold value, determining a query input based on the first input and at least one of the structural knowledge, the user preference signature, a location of the user, and a time of the first input and selecting a subset of content items from the set of content items based on comparing the query input and the metadata associated with the subset of content items. The method also includes, upon a condition in which the ambiguity index does not exceed the first threshold value, selecting a subset of content items from the set of content items based on comparing the first input and the metadata associated with the subset of content items.

In another embodiment, the method also includes presenting the subset of content items to the user.

In yet another embodiment, the ambiguity index is determined based on a number of possible interpretations of the first input.

In a different embodiment, the method further includes, upon a condition in which the ambiguity index exceeds the first threshold value, determining which portion of the first input is ambiguous. The determination of the query input can be further based on the ambiguous portion of the input.

In a further embodiment, the method includes determining intent, entity, and filter of the input. The intent can be what is sought by the user, the entity can be a noun or pronoun describing the intent, and the filter can be a qualifier of the entity.

In yet another embodiment, the method includes, upon a condition in which the ambiguity index exceeds a second threshold value, asking for and receiving a second input from the user. The determination of the query input can be further based on the second input.

In another embodiment, the method includes asking for and receiving a second input from the user. The determination of the query input can be further based on the second input.

In yet another embodiment, the second threshold value is higher than the first threshold value.

In an embodiment, a system for disambiguating user intent in conversational interactions for information retrieval is provided. The system includes computer readable instructions encoded on a non-transitory computer readable medium. The computer readable instructions cause a computer system to provide access to a set of content items, each of which are associated with metadata that describes the corresponding content items and provide access to structural knowledge, the structural knowledge showing semantic relationships and links among the content items. The computer readable instructions also cause the computer system to provide a user preference signature describing preferences of a user for at least one of (i) particular content items and (ii) metadata associated with the content items, receive a first input from the user intended by the user to identify at least one desired content item, and determine an ambiguity index of the first input. The computer readable instructions further cause computer system to, upon a condition in which the ambiguity index exceeds a first threshold value, determine a query input based on the first input and at least one of the structural knowledge, the user preference signature, a location of the user, and a time of the first input and select a subset of content items from the set of content items based on comparing the query input and the metadata associated with the subset of content items. The computer readable instructions also cause computer system to, upon a condition in which the ambiguity index does not exceed the first threshold value, select a subset of content items from the set of content items based on comparing the first input and the metadata associated with the subset of content items.

BRIEF DESCRIPTION OF THE DRAWINGS

For a more complete understanding of various embodiments of the present invention, reference is now made to the following descriptions taken in connection with the accompanying drawings in which.

DETAILED DESCRIPTION OF THE PREFERRED EMBODIMENTS

Figure 1:
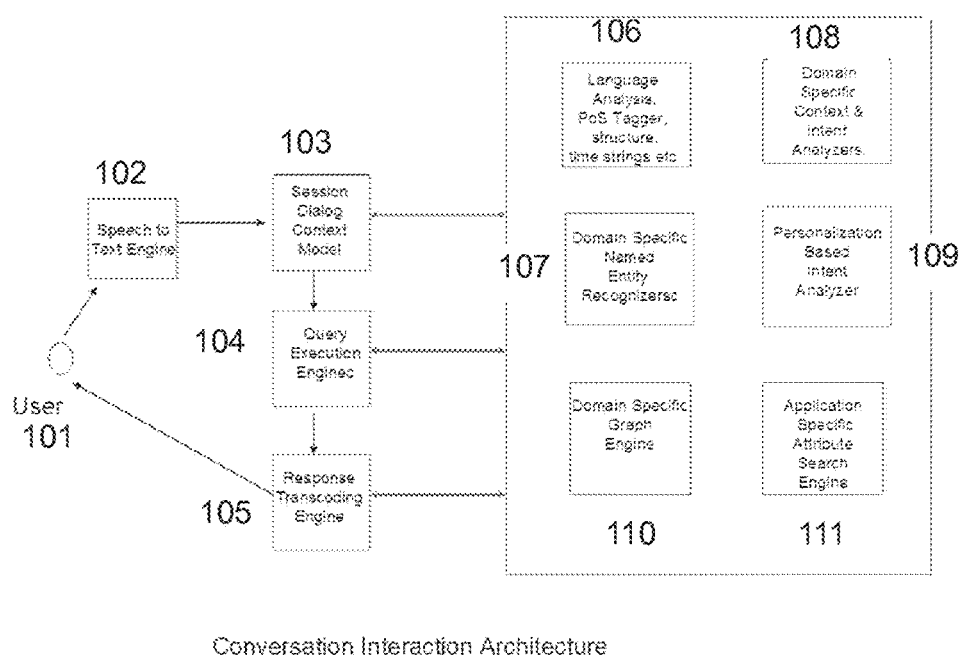
FIG. 1 illustrates an architecture that is an embodiment of the present invention.
Figure 2:
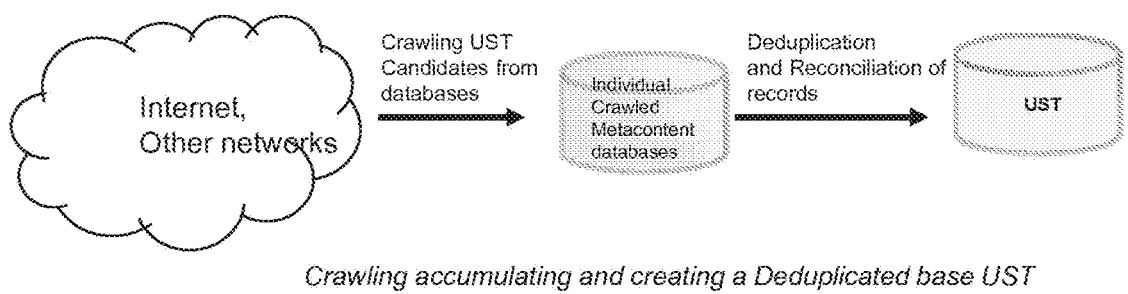
FIG. 2 illustrates the creation of a domain specific structural knowledge repository.

Preferred embodiments of the invention include methods of and systems for disambiguating user's intent and satisfying that intent in a conversational exchange. Preferred embodiments of the present invention and their advantages may be understood by referring to FIGS. 1-4, wherein like reference numerals refer to like elements.

Creation of Information Repositories

Figure 3:
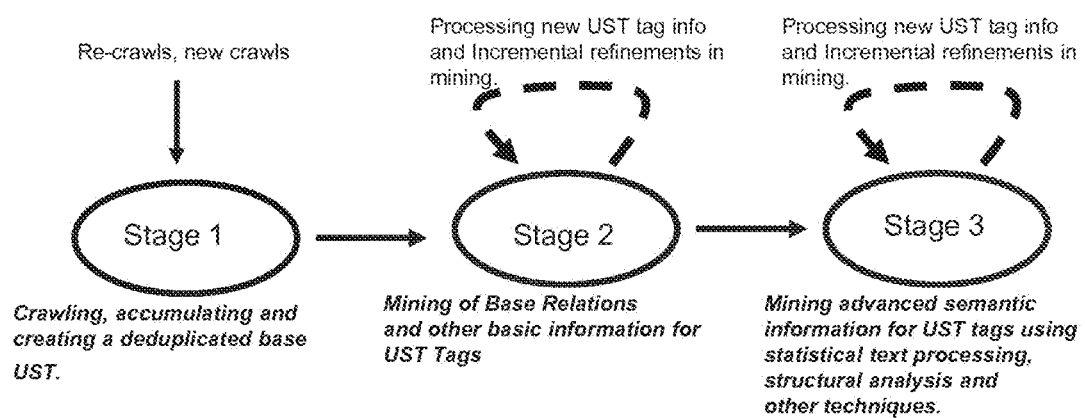
FIG. 3 illustrates the stages to create a domain specific structural knowledge repository.

The domain specific information repositories used to disambiguate user intent/input are constantly evolving, extensible database of named entities consolidated by putting together many structured and unstructured information gathered from disparate sources. As the structural knowledge is consolidated from disparate sources, shown in FIG. 2, implicit and explicit semantic relationships and links are created among members of the information repository itself, by performing statistical text processing, link analysis and analyses of other signals (for e.g. location information etc) on the metacontent available for the named entities. These relationships are always evolving (as shown in FIG. 3), and over time are enhanced by aggregate usage analytics, collaborative filtering and other techniques.

Each named entity in an information repository is represented as a vector of weighted text-phrases (terms), in a manner similar to the way textual information retrieval work represents documents as a vector of weighted text-phrases. Since simple "tf-idf" (term frequency/inverse document frequency) based approaches alone are not adequate for the purposes of implementations of the invention in many important cases. The weight computation in the vector representation of named entities is designed to take advantage of many more information signals present in the way the text phrases are displayed, the positions of the text phrases within text descriptions of various kinds, and also the structural and positional properties of hyperlinks associated with text phrases. The weight computation is therefore based on a richer statistical and structural analysis of the textual, hyperlinking and other properties and relationships mined from metacontent in the information repository.

In a preferred embodiment of the invention, the creation of the information repository is driven by named entity consolidation engine, which essentially computes a simple weighted text-phrase vector representation of each content item based on its textual meta-content, then efficiently calculates a 'dot product' of the item's text-phrase vector with the text-phrase vectors corresponding to all named entities, then collects a list of all named entities corresponding to dot products that crossed a threshold, applies further filtering as well as re-ordering criteria (which may include non-textual metacontent of the item and the entities), and then finally outputs a final list of entities related to the item. The process is similar to the way web search engines treat a search query as a vector and perform a kind of dot product computation to rank meaningful documents from its index.

The technique for creating the information repository enables embodiments of the present invention to produce a rich weighted text-phrase vector representation of any niche vertical that may not map to some single Named Entity, and also can discover new relationships between existing entities. To summarize, the information repositories built using the methods described above serve as the basis for lexical and semantic level disambiguation of user intent/input and assist many of the modules described in FIG. 1 architecture. An important module that relies on this repository to build its own representation, that is part of the disambiguation mechanisms described in the present disclosure, is the graph engine 110 described below.

Information Repositories Applicable to Embodiments of the Present Invention

Some information repositories include entities and relationships between the entities. Each entity/relationship has a type, respectively, from a set of types. Furthermore, associated with each entity/relationship are a set of attributes, which can be captured, in some embodiments, as a defined finite set of name-value fields. The entity/relationship mapping also serves as a set of metadata associated with the content items because the entity/relationship mapping provides information that describes the various content items. In other words, a particular entity will have relationships with other entities, and these "other entities" serve as metadata to the "particular entity". In addition, each entity in the mapping can have attributes assigned to it or to the relationships that connect the entity to other entities in the mapping. Collectively, this makes up the metadata associated with the entities/content items. In general, such information repositories are called structured information repositories, and the information, provided by the structured information repositories, is called structural knowledge. In some embodiments, the present invention uses structured information repositories to access structural knowledge for information retrieval.

Some information repositories are associated with domains, which are groupings of similar types of information and/or certain types of content items. These domain specific structured information repositories contain domain specific structural knowledge. The structured information repositories that the present invention uses may be domain specific information repositories. Examples of information repositories associated with domains follow below.

A media entertainment domain includes entities, such as, movies, TV-shows, episodes, crew, roles/characters, actors/personalities, athletes, games, teams, leagues and tournaments, sports people, music artists and performers, composers, albums, songs, news personalities, and/or content distributors. These entities have relationships that are captured in the information repository. For example, a movie entity is related via an "acted in" relationship to one or more actor/personality entities. Similarly, a movie entity may be related to an music album entity via an "original sound track" relationship, which in turn may be related to a song entity via a "track in album" relationship. Meanwhile, names, descriptions, schedule information, reviews, ratings, costs, URLs to videos or audios, application or content store handles, scores, etc. may be deemed attribute fields.

A personal electronic mail (email) domain includes entities, such as, emails, email-threads, contacts, senders, recipients, company names, departments/business units in the enterprise, email folders, office locations, and/or cities and countries corresponding to office locations. Illustrative examples of relationships include an email entity related to its sender entity (as well as the to, cc, bcc, receivers, and email thread entities.) Meanwhile, relationships between a contact and his or her company, department, office location can exist. In this repository, instances of attribute fields associated with entities include contacts' names, designations, email handles, other contact information, email sent/received timestamp, subject, body, attachments, priority levels, an office's location information, and/or a department's name and description.

A travel-related/hotels and sightseeing domain includes entities, such as, cities, hotels, hotel brands, individual points of interest, categories of points of interest, consumer facing retail chains, car rental sites, and/or car rental companies. Relationships between such entities include location, membership in chains, and/or categories. Furthermore, names, descriptions, keywords, costs, types of service, ratings, reviews, etc. all amount of attribute fields.

An electronic commerce domain includes entities, such as, product items, product categories and subcategories, brands, stores, etc. Relationships between such entities can include compatibility information between product items, a product "sold by" a store, etc. Attribute fields in include descriptions, keywords, reviews, ratings, costs, and/or availability information.

An address book domain includes entities and information such as contact names, electronic mail addresses, telephone numbers, physical addresses, and employer.

The entities, relationships, and attributes listed herein are illustrative only, and are not intended to be an exhaustive list.

Embodiments of the present invention may also use repositories that are not structured information repositories as described above. For example, the information repository corresponding to network-based documents (e.g., the Internet/World Wide Web) can be considered a relationship web of linked documents (entities). However, in general, no directly applicable type structure can meaningfully describe, in a nontrivial way, all the kinds of entities and relationships and attributes associated with elements of the Internet in the sense of the structured information repositories described above. However, elements such as domain names, internet media types, filenames, filename extension, etc. can be used as entities or attributes with such information.

For example, consider a corpus consisting of a set of unstructured text documents. In this case, no directly applicable type structure can enumerate a set of entities and relationships that meaningfully describe the document contents. However, application of semantic information extraction processing techniques as a pre-processing step may yield entities and relationships that can partially uncover structure from such a corpus.

Illustrative Examples of Accessing Information Repositories Under Certain Embodiments of the Present Invention The following description illustrates examples of information retrieval tasks in the context of structured and unstructured information repositories as described above.

In some cases, a user is interested in one or more entities of some type—generally called intent type herein—which the user wishes to uncover by specifying only attribute field constraints that the entities must satisfy. Note that sometimes intent may be a (type, attribute) pair when the user wants some attribute of an entity of a certain type. For example, if the user wants the rating of a movie, the intent could be viewed as (type, attribute)=(movie, rating). Such query-constraints are generally called attribute-only constraints herein.

Whenever the user names the entity or specifies enough information to directly match attributes of the desired intent type entity, it is an attribute-only constraint. For example, when the user identifies a movie by name and some additional attribute (e.g., 'Cape Fear' made in the 60s), or when he specifies a subject match for the email he wants to uncover, or when he asks for hotels based on a price range, or when he specifies that he wants a 32 GB, black colored iPod touch.

However, in some cases, a user is interested in one or more entities of the intent type by specifying not only attribute field constraints on the intent type entities but also by specifying attribute field constraints on or naming other entities to which the intent type entities are connected via relationships in some well defined way. Such query-constraints are generally called connection oriented constraints herein.

An example of a connection oriented constraint is when the user wants a movie (an intent type) based on specifying two or more actors of the movie or a movie based on an actor and an award the movie won. Another example, in the context of email, is if the user wants emails (intent type) received from certain senders from a particular company in the last seven days. Similarly, a further example is if the user wants to book a hotel room (intent type) to a train station as well as a Starbucks outlet. Yet another example is if the user wants a television set (intent type) made by Samsung that is also compatible with a Nintendo Wii. All of these are instances of connection oriented constraints queries.

In the above connection-oriented constraint examples, the user explicitly describes or specifies the other entities connected to the intent entities. Such constraints are generally called explicit connection oriented constraints and such entities as explicit entities herein.

Meanwhile, other queries contain connection oriented constraints that include unspecified or implicit entities as part of the constraint specification. In such a situation, the user is attempting to identify a piece of information, entity, attribute, etc. that is not know through relationships between the unknown item and items the user does now. Such constraints are generally called implicit connection oriented constraints herein and the unspecified entities are generally called implicit entities of the constraint herein.

For example, the user may wish to identify a movie she is seeking via naming two characters in the movie. However, the user does not recall the name of one of the characters, but she does recall that a particular actor played the character. Thus, in her query, she states one character by name and identifies the unknown character by stating that the character was played by the particular actor.

However consider the following user constraints for specific information retrieval goals: The user wants the role (intent) played by a specified actor (e.g., 'Michelle Pfeiffer') in an unspecified movie that is about a specified role (e.g., the character 'Tony Montana'.) In this case the user's constraint includes an unspecified or implicit entity which corresponds to the movie 'Scarface.' Similarly, suppose that the user wants the movie (intent) starring the specified actor 'Scarlett Johannsen' and the unspecified actor who played the specified role of 'Obe Wan Kanobi' in a specified film 'Star Wars.'

In this case the implicit entity is the actor 'Ewan McGregor' and the intent entity is the movie 'The Island' starring 'Scarlett Johannsen' and 'Ewan McGregor'.

In the context of email repository, an example includes a user wanting to get the last email (intent) from an unspecified gentleman from a specified company 'Intel' to whom he was introduced via email (an attribute specifier) last week. In this case, the implicit entity is a contact who can be discovered by examining contacts from 'Intel', via an employee/company relationship, who was a first time common-email-recipient with the user last week.

The above three examples are connection oriented constraints but they include unspecified or implicit entities as part of the constraint specification—We call such constraints implicit connection oriented constraints and call the unspecified entities as implicit entities of the constraint.

In the context of connection oriented constraints, it is useful to basically map entities and relationships of information repositories to nodes and edges of a graph. The motivation for specifically employing the graph model in lieu of the entity relationship model is the observation that relevance, proximity and relatedness in natural language conversation can be modeled simply by notions such as link-distance and in some cases shortest paths and smallest weight trees. During conversation when a user dialog involves other entities related to the actually sought entities, a subroutine addressing information retrieval as a simple graph search problem effectively helps reducing dependence on deep unambiguous comprehension of sentence structure, which can be a huge implementation benefit. Even if user intent calculation is ambiguous or inconclusive, so long as entities have been recognized in the user utterance, a graph-interpretation based treatment of the problem enables our system to respond in a much more intelligible manner than otherwise possible.

Conversational Interaction Interface for Disambiguating User Intent/Input

We presently describe the Conversational Interaction interface of embodiments of the present invention that is used for disambiguating user intent/input. If a user is able to interact with an information retrieval system by posing a query or instruction by speaking to it and optionally selecting options by touching or by a keypad or mouse, we deem it a conversational interaction interface. Response to a user query may be performed by machine generated spoken text to speech and may be supplemented by information displayed on a user screen. A conversation interaction interface, in general, nearly always allows a user to pose his next information retrieval query or instruction in reaction to the information retrieval system's response to a previous query, so that information retrieval session is a sequence of operations each of which has the user first posing a query or instruction and the system presenting a response to the user.

In essence, implementations of the Conversational Interaction interface described in the present disclosure are a more effective and expressive paradigm than graphical UIs for disambiguating user input/intent. In many situations, especially when it comes to flexibly selecting from among a large number of possible attributes or the presence of explicit and implicit connected nodes, the graphical UI approach doesn't work well or doesn't work at all. In such cases, a Conversational Interaction interface is a much more natural fit and, moreover, one that, with the advent of improved speech recognition techniques, will delight users.

Now, we describe architecture, components and implementation of an information retrieval system for conversational interaction.

Conversational System Architecture

FIG. 1 represents the overall system architecture and basic information flow of an embodiment of the present invention. User 101 speaks his/her question that is fed to a speech to text engine 102. While the input could be speech, the present invention does not preclude the input to be direct text input. The text form of the user input is fed to session dialog content module 103. This module plays the role of maintaining state across conversations, one use of which is to help in understanding user intent during a conversation, as described below. The session dialog, in conjunction with a language analyzer (or part of speech tagger) 106, and the other entity recognizer modules described below, breaks down the sentence into its constituent parts that can be broadly categorized as (1) intents—the actual intent of the user such as find a movie, play a song, tune to a channel, respond to an email, etc. (2) entities—noun or pronoun phrases describing the intent and (3) attributes—qualifiers to entities such the "latest" movie, "less" violence etc. In the context of the goal of providing an intelligent and meaningful conversation, the intent is sometimes the most important among all three categories. Any good search engine can perform an information retrieval task fairly well just by extracting the entities from a sentence—without understanding the grammar or the intent.

For instance, when given the user question "Can my daughter watch pulp fiction with me?" most search engines would show a link for pulp fiction, which may suffice if the rating is available from traversing that link. But in a conversational interface, the expectation is clearly higher—the system must ideally understand the (movie,rating) intent corresponding to the expected response of the rating of the movie and the age group it is appropriate for. A conversational interface response degenerating to that of a search engine is tantamount to a failure of the system from a user perspective. Intent determination, and even more importantly, responding to user's question that appears closer to a human's response when the intent is not known or clearly discernible, is key for a conversational interface that strives to be closer to human interaction than to a search engine.

Intent analyzer 108 is a domain specific module that analyzes and classifies intent for a domain and works in conjunction with other modules—domain specific entity recognizer 107, personalization based intent analyzer 109 that classifies intent based on user's personal preferences, and the domain specific graph engine 110. The attribute specific search engine 111 assists in recognizing attributes and their weights influence the entities they qualify. While FIG. 1 is a conversation architecture showing the modules for a specific domain, embodiments of the present invention include a conversation interface that can take user input and engage in a dialog where user's intent can span domains. In an embodiment of the invention, this is accomplished by having multiple instances of the domain specific architecture shown in FIG. 1, and scoring the intent weights across domains to determine user intent. This scoring mechanism is also used to implicitly determine conversation topic switching (for example, during an entertainment information retrieval session, a user could just say "I am hungry"). Another example of a new conversation beginning being implicitly determined User: When are we playing the Yankees
 Response: New York Yankees are playing at Boston Red
  Sox on Friday
 July 6 (7 pm) available to watch in NESN HD
 User: Can you record the game for me Response: Scheduled the recording New York Yankees vs. Boston Red Sox on Friday July 6 (7 pm).
User: Is the movie Iron Man available in Netflix
Response: Iron Man and Iron Man 2 are available in Netflix Instant. Do you want to add them to your instant queue?

In situations where responses from different domains are equally likely, embodiments of the system described in the present disclosure pose a disambiguating question to user User: I'm looking for a good music app
Response: Do you want to stream music or do you want news and information on music?
In this example, the illustrative system described in the present disclosure identifies the genre "music" and the Knowledge Graph is used to compute two differentiating factors across popular applications in the music genre: streaming radio type offerings and news and information apps.
User: I would like more information on different artists and bands
Response: Here is a list of popular apps: last.fm, allmusic, etc.

The system identifies the phrase information and filters the list of app results to those that are more news and information based.

The language analysis module 106 is a pluggable module in the architecture to enable to system to support multiple languages. While understanding the semantics of user input is not constrained to the language module 106 alone, the core modules of the architecture such as dialog context module 103 or graph engine 110 are language independent. As mentioned earlier, the language module alone cannot do much more than analysis of a sentence and performing tasks such a relating a pronoun to its subject/object etc. ("The Led Zeppelin song in the Original Sound Track (OST) of the recent Daniel Craig movie . . . Who performed it?"); it is ineffective in isolation to associate pronouns across exchanges. It is the interaction with the session dialog context module 103, that enables resolution of pronouns across exchanges as in Q1: who acts as obi-wan Kenobi in the new star wars?
A: Ewan McGregor
Q2: how about his movies with Scarlet Johansson While it may seem, at first glance, that dialog session context is a simple state maintenance of the last active entity or entities, the following examples show the lurking complexity in dialog session context Q1: Who played the lead roles in Kramer vs Kramer?
A1: Meryl Streep and Dustin Hoffman
Q2: how about more of his movies
A2: Here are some of Dustin Hoffman movies . . . [list of Dustin Hoffman movies]
Q3: what about more of her movies?
A3 [list of movies if any]
Q4 What about just his early movies?
A4 [list of movies if any]
Q5 What about her recent movies?
A5 [list of movies if any]
Q6 Have they both acted again in the recent past?
A6 [list of movies if any]
Q7 Have they both ever acted again at all?

In the example above, the entities Meryl Streep and Dustin Hoffman are indirectly referred to in six questions, sometimes together and sometimes separately. The above example also illustrates one of the important distinctions of embodiments of the present invention from simple request response systems that engage in an exploratory exchange around a central theme. While embodiments of the present invention not only resolve ambiguities in an exchange, they simultaneously facilitate an exploratory exchange with implicit references to entities and/or intents mentioned much earlier in a conversation—something that is naturally done in rich human interactions.

The following example illustrates user referring to an entity who is not even explicitly specified in a prior exchange (an implicit connection oriented constraint). Q1 Which show had that physically challenged scientist alluding to the possibility of non-carbon based life form
A That was Stephen Hawking's discovery channel program on aliens.
Q2 Was he there in another show that David Attenborough produced?

Another example of dialog state maintenance not being restricted to just entities and their attributes is when the system maintains state of intents too so they get carried across conversation exchanges, as is evident in the example below Q1 "Can my daughter watch pulp fiction with me"
A1 Pulp fiction by Quentin Tarantino is rated R for graphic violence and nudity
Q2 What about his other movies?
A2 They are all rated R—Reservoir Dogs, Jackie Brown, Kill Bill, Death Proof.

In this example, in addition to maintaining state of the entity "Quentin Tarantino," which enables the system to understand the pronoun reference to him (in the form of "his") in Q2, the system also keeps track of user intent across the exchanges—the user intent being the "rating". It is this maintenance that facilitates a succinct and directed response as in A2, almost matching a human interaction.

The directed responses illustrated above are possible with the domain specific intent and entity analyzers 108, 109 working in close concert with the personalization based intent analyzer 109. These modules are all assisted by an application specific attribute search engine 111 that assists in determining relevant attributes (e.g. latest, less of violence, more of action) and assigning weights to them. So a user input exchange that comes from the speech to text engine 102 would, after processing where all the modules described above work in concert (with the query execution engine 104 playing a coordinating role), would yield one or more candidate interpretations of the user input. For instance, in response to the question "Do you have the Kay Menon movie about the Bombay bomb blasts?" the system may have two alternative candidate representations wherein one has "Bombay" as an entity (there is a movie called Bombay) with "bomb blast" being another attribute and the other has "Bombay bomb blast" as a single entity. The system then attempts to resolve between these candidate representations by engaging in a dialog with the user, on the basis of the presence of the other recognized entity Kay Kay Menon who is an actor.

In some instances, resolution of ambiguity can be done, without engaging in a dialog, by knowing user's preferences. For instance, the user may ask "Is there a sox game tonight?" While this question has an ambiguous portion— the ambiguity of the team being the Boston Red Sox or the Chicago White Sox—if the system is aware that user's preference is Red Sox, then the response can be directed to displaying a Red Sox game schedule if there is one that night. In instances where there are multiple matches across domains, the domain match resulting in the higher overall confidence score will win. Personalization of results can also be done, when applicable, based on the nature of the query.

For instance, if the user states "show me movies of Tom Cruise tonight", this query should not apply personalization but just return latest movies of Tom Cruise. However if user states "show me sports tonight", system should apply personalization and display sports and games that are known to be of interest to the user based on his explicit preferences or implicit actions captured from various sources of user activity information.

Unlike existing systems, where user's preferences (implicitly or explicitly inferred) are applied in a binary manner (like an on or off "switch"), embodiments of the present invention use the signature of user preferences (referred to as personal graph also in the present disclosure, which captures user activity and interests, both implicitly and explicitly determined) in a context dependent manner to resolve ambiguities in user input and, if applicable, applies personalization to result selection also to offer the best response that has a high likelihood of matching user's intent. Certain embodiments of the present invention use the signature of user preferences, if available, to resolve ambiguity in user's input. However, the use of signature for tailoring results is very much dependent on the level of precision in the definition of entities specified in the user input, subsequent to the disambiguation step just mentioned.

A user preference signature can be provided by the system using known techniques for discovering and storing such user preference information. For example, the methods and systems set forth in U.S. Pat. No. 7,774,294, entitled Methods and Systems for Selecting and Presenting Content Based on Learned Periodicity of User Content Selections, issued Aug. 10, 2010, U.S. Pat. No. 7,835,998, entitled Methods and Systems for Selecting and Presenting Content on a First System Based on User Preferences Learned on a Second System, issued Nov. 16, 2010, U.S. Pat. No. 7,461,061, entitled User Interface Methods and Systems for Selecting and Presenting Content Based on User Navigation and Selection Actions Associated with the Content, issued Dec. 2, 2008, and U.S. Pat. No. 8,112,454, entitled Methods and Systems for Ordering Content Items According to Learned User Preferences, issued Feb. 7, 2012, each of which is incorporated by reference herein, can be used with the techniques disclosed herein. However, the use of user's preference signatures and/or information is not limited to the techniques set forth in the incorporated applications.

The relationship or connection engine 110 is one of the modules that plays a role in comprehending user input to offer a directed response. The relationship engine could be implemented in many ways, a graph data structure being one instance so that we may call the relationship engine by the name graph engine. The graph engine evaluates the user input in the backdrop of known weighted connections between entities.

The level of precision of definition of an entity is captured in nodes of the graph engine 110. Each entity node in the graph engine, 110 is assigned an ambiguity index, which is a statistically determined score for an entity—and could be continuous range of values, say from a "low" value to a "high" value, where "low" means low ambiguity and "high" means high, and all intermediate values between these end limits. This ambiguity index is used to determine when a personal graph (if available) can be made use of. One example is the following conversation:

User: Is there a game tonight? (or) Are we playing tonight?
Response: Boston Red Sox are playing at Florida Marlins tonight (7 pm) available to watch in ESPN HD.

In this example, user input "sox" has a high ambiguity index. System maps the verb phrase "Is there a game" to the entity type sports and associates the entity Boston Red Sox for this user based on his/her Personal Graph. The decision to personalize was driven by the ambiguity index of "sox". The adjective "tonight" acts as a temporal specifier for refining the query. Note that while the user's input had ambiguity, after resolving user's intent to "red sox" based on personal preference, the input is no longer ambiguous (given the "low" ambiguity score of "red sox"). Hence, the results are not personalized since the ambiguity index is low now (after mapping to Boston red sox). In the alternate variation, the pronoun "we" got associated with the entity Boston Red Sox. Another example follows:

User: When are we playing the Yankees
Response: New York Yankees are playing at Boston Red Sox on Friday
July 6 (7 pm) available to watch in NESN HD
User: Can you record the game for me
Response: Scheduled the recording New York Yankees vs. Boston Red Sox on Friday July 6 (7 pm).

In this example, the system extracts the entity New York Yankees and the pronoun 'we' got attributed to entity Boston Red Sox based on user personal graph.

The personalization performed above is based on signature of user's past activity including in social networking sites, media consumption, SMS, tweeting activity, etc., and also including signature of user's personal corpus of emails, calendar appointment entries, task/todo lists, documents etc. As stated before, while signature of user's preference is, in some cases, used to resolve ambiguities in user input (e.g. is there a "sox" game tonight, are "we" playing tonight), subsequent to resolving user input ambiguities, the occurrence of entities still having a high ambiguity index determines if user's personal graph should be made use of for tailoring results to match user's intent. For instance, even if user has Tom Cruise and Demi Moore in his personal graph, the following query would not trigger personalization of results—this is because the user's intent is clear and unambiguous.

User: Has Tom Cruise acted with Demi Moore?
The response to this would not apply user's personal graph information, since the entities in this query have a low ambiguity index. However, for the following query:
User: Is there a sox game tonight?
Personalization will be applied since "sox" has an ambiguity index associated with it. The following provide more examples of user's personal graph assisting in resolving ambiguity in user input and to personalize results to match user's interest:

User: "when are the sox playing San Francisco Giants"
Case 1: Red Sox is in the user's signature
Response: "the Boston Red Sox are not playing the San Francisco Giants this season"
Case 2: Red Sox is not in the user's signature
A: "Did you mean the Boston Red Sox or the Chicago White Sox"

Note that although one of the entities, San Francisco Giants, is well specified (the ambiguity index is "low"), we still need to use personalization to disambiguate the other entity "sox" (which has a "high" ambiguity index). To summarize, "ambiguity index" of "high" means use "personal graph" to resolve ambiguity but once the ambiguity is resolved, if it becomes a case of a "very precisely specified entity" and no "personalization" is used for computation of the answer. However, if the ambiguity index remains high even after disambiguation step, then personalization is applied.

Disambiguation Cases

Figure 4:
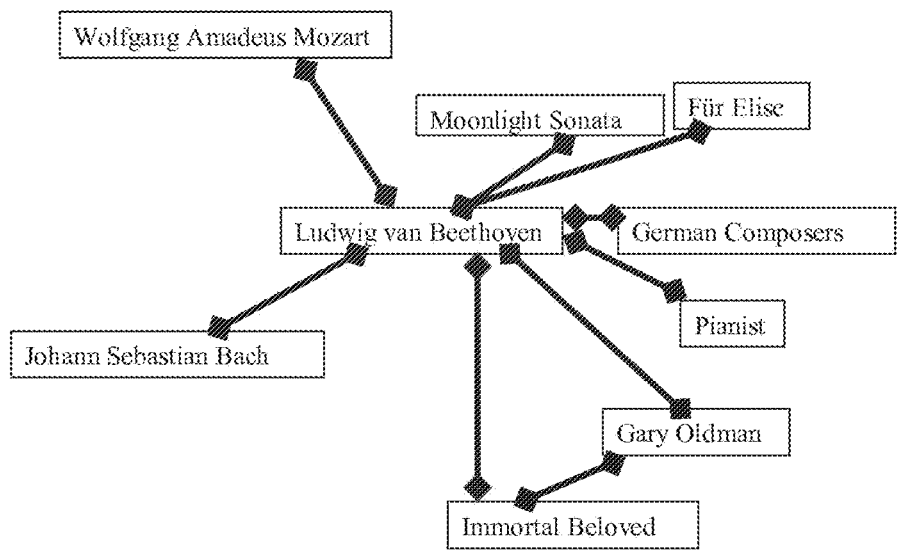
FIG. 4 illustrates a schematic representation of a portion of the domain specific knowledge repository entities and relationships between entities.

FIG. 4 illustrates a portion of the graph of connections and links between named entities. In the case of user making the request "show me the Beethoven movie", the ambiguity is lexical in nature—the question matches movies about Beethoven the composer and the movie with a dog named Beethoven. FIG. 4 shows a named entity "Beethoven" with links to this node that represent in an abstract sense, the systems "mental model" for Beethoven the composer. There is an equivalent sub graph with an entity called "Beethoven" whose links and attributes clearly identify it as a canine. When the user input matches such disparate entities (the graph distance between these two combined with the correlation of attributes of these nodes are a measure of the closeness of these entities), the system realizes that the ambiguity is most likely lexical and poses an appropriate response that disambiguates these two nodes using their key differentiating attribute—person vs dog. Once this key disambiguating difference is inferred by the system, the response generated could vary. In one embodiment, the system may pose a disambiguating question "Did you mean the composer or the dog named Beethoven" ? and then respond to user's feedback.

In another embodiment, the system may combine the disambiguation and answers into a single response, by saying, "If you meant the musician, here are two movies about him <and list/speaks the movies>." If you meant the dog, here is the movie about the dog <and lists/speaks the movies>. This response is distinctly different from a "search engine level intelligence", where both the results may be listed and even be mixed (a Beethoven composer result, followed by the dog movie, followed by another Beethoven movie), in some order of relevance, with no understanding exhibited by the system that there is an ambiguity between a person and a dog in the user's question.

In another example, "Who is Micheal Jones?", the user wants to know about a particular Micheal Jones, and there are multiple lexical matches to the user's question. One of the matches is an American health care executive and conservative policy analyst. The other is an Australian singer-songwriter who participated in the TV show "American idol". Since the very intent of the user was "Who is Micheal Jones?", it would look quite comical for the system to respond with the disambiguating question "Did you mean the American idol participant or the conservative policy analyst"—since the user's very question indicates user does not know either. In this case, the present embodiment would draft a disambiguating response which doubles as the very answer to the question user asked, "There are two prominent people with that name—one is a singer-songwriter who participated in American Idol and the other is a conservative policy analyst".

For another example—"I want to watch who wants to be a millionaire" there are three qualifying matches—US game show, UK game show, and Singaporean game show. In one scenario, where signature of user preferences is not known but user location is known, the correct game show can be picked implicitly (e.g. US one for a person in US etc.). However, if signature of user's preferences are present, signature may override user's location. For instance, user may be visiting UK on business but still wants to watch the version from his home country, say US. If neither location nor user preferences are available, system would pose a disambiguating question of the following type, "There are three different shows with the same name, in three countries. Which one would you like to watch?<and displays/speaks the three shows>".

In another example, "Tell me something about Australia" the domain specific structural knowledge, described in the present disclosure, helps the system identify that there is a conflict between Australia the country, and two movies with the same name (an English film "Australia" shot in 1989 and an Indian movie in Malayalam with the same name shot in 1992). In this case, the signature of user's preferences, and history, particularly information gleaned from user's personal corpus may indicate user is traveling to Australia in the near future. This information, combined with the understanding that Australia refers to a country, would be used by the system to implicitly disambiguate user's question to stand for Australia the country, and directly display a response about the country. Here the disambiguation using personal corpus and domain specific knowledge eliminates even a clarifying exchange, making the system response closer to a human interaction.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, and/or mobile computing devices capable of receiving the signals discussed herein can be used in implementations of the invention.

The various aspects and embodiments of the invention can be used in conjunction with the techniques set forth in the following applications, all of which are incorporated by reference herein:

U.S. Provision Application No. 61/673,867, entitled "A Conversational Interaction System for Large Corpus Information Retrieval", filed Jul. 20, 2012;

U.S. patent application Ser. No. 12/879,141, entitled "Method of and System for Presenting Enriched Video Viewing Analytics", filed Sep. 10, 2010; and U.S. Pat. No. 7,774,294, entitled "Methods and Systems for Selecting and Presenting Content Based on Learned Periodcity of User Content Selections".

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

What is claimed is:

1. A method of disambiguating user intent in conversational interactions for information retrieval, the method comprising:
    receiving, for a set of content items, metadata describing each respective content item of the set of content items;
    receiving structural knowledge, the structural knowledge showing semantic links between content items;
    receiving an input from a user, the input intended to identify at least one content item;
    determining, based on how well the input matches information in an information domain space, an ambiguity level of the input;
    determining whether the ambiguity level meets or exceeds a threshold value; and
    in response to determining that the ambiguity level meets or exceeds the threshold value:
        determining a disambiguated input based on the input and at least one of the structural knowledge, a user preference, a location of the user, and a time of the first input; and
        selecting a subset of content items from the set of content items based on comparing the disambiguated input with the metadata describing each respective content item of the set of content items.

2. The method of claim 1, wherein the subset of content items comprises a plurality of associated content items, the method further comprising:
    determining that the input is intended to identify a single content item;
    ordering the subset of content items based on the structural knowledge;
    constructing a natural language message stating that the first content item of the ordered subset of content items matches the disambiguated input and that the remaining content items of the ordered subset of content items also match the disambiguated input; and
    generating for display a notification for the user comprising the natural language message.

3. The method of claim 1, further comprising:
    in response to determining that the ambiguity level does not exceed the threshold value, selecting a subset of content items from the set of content items based on comparing the first input with the metadata describing each respective content item of the set of content items.

4. The method of claim 1, further comprising:
    in response to determining that none of the structural knowledge, the user preference, the location of the user, and the time of the input disambiguates the input:
        presenting a disambiguating question to the user;
        receiving a second input from the user in response to the disambiguating question; and
        determining the disambiguated input further based on the second input.

5. The method of claim 1, further comprising:
    in response to determining that none of the structural knowledge, the user preference, the location of the user, and the time of the input disambiguates the input:
        generating for display a notification for the user that multiple options exist for the input; and
        selecting the multiple options as the subset of content items.

6. The method of claim 1, wherein determining the disambiguated input further comprises:
    determining whether the user preference is available;
    in response to determining that the user preference is available, determining the disambiguated input based on the user preference; and
    in response to determining that the user preference is not available, determining the disambiguated input based on at least one of the structural knowledge, the location of the user, and the time of the input.

7. The method of claim 1, wherein determining the disambiguated input is further based on user history.

8. The method of claim 1, wherein the subset of content items comprises episodes of a series, and wherein selecting the subset of content items comprises selecting a second episode of the series that follows a first episode of the series that the user most recently watched.

9. The method of claim 1, wherein the subset of content items comprises at least one location, and further comprising displaying the at least one location on a map.

10. The method of claim 1, wherein selecting the subset of content items from the set of content items based on comparing the disambiguated input with the metadata describing each respective content item of the set of content items comprises:
    determining, based on the comparing, that no content items in the set of content items satisfy the disambiguated input; and;
    selecting a subset of content items that satisfies a portion of the disambiguated input.

11. A system for disambiguating user intent in conversational interactions for information retrieval, the system comprising:
    control circuitry configured to:
        receive, for a set of content items, metadata describing each respective content item of the set of content items;
        receive structural knowledge, the structural knowledge showing semantic links between content items;
        receive an input from a user, the input intended to identify at least one content item;
        determine, based on how well the input matches information in an information domain space, an ambiguity level of the input;
        determine whether the ambiguity level meets or exceeds a threshold value; and
        in response to determining that the ambiguity level meets or exceeds the threshold value:
            determine a disambiguated input based on the input and at least one of the structural knowledge, a user preference, a location of the user, and a time of the first input; and
            select a subset of content items from the set of content items based on comparing the disambiguated input with the metadata describing each respective content item of the set of content items.

12. The system of claim 11, wherein the subset of content items comprises a plurality of associated content items, and wherein the control circuitry is further configured to:
determine that the input is intended to identify a single content item;
order the subset of content items based on the structural knowledge;
construct a natural language message stating that the first content item of the ordered subset of content items matches the disambiguated input and that the remaining content items of the ordered subset of content items also match the disambiguated input; and
generate for display a notification for the user comprising the natural language message.

13. The system of claim 11, wherein the control circuitry is further configured to:
in response to determining that the ambiguity level does not exceed the threshold value, select a subset of content items from the set of content items based on comparing the first input with the metadata describing each respective content item of the set of content items.

14. The system of claim 11, wherein the control circuitry is further configured to:
in response to determining that none of the structural knowledge, the user preference, the location of the user, and the time of the input disambiguates the input:
present a disambiguating question to the user;
receive a second input from the user in response to the disambiguating question; and
determine the disambiguated input further based on the second input.

15. The system of claim 11, wherein the control circuitry is further configured to:
in response to determining that none of the structural knowledge, the user preference, the location of the user, and the time of the input disambiguates the input:
generate for display a notification for the user that multiple options exist for the input; and
select the multiple options as the subset of content items.

16. The system of claim 11, wherein the control circuitry configured to determine the disambiguated input is further configured to:
determine whether the user preference is available;
in response to determining that the user preference is available, determine the disambiguated input based on the user preference; and
in response to determining that the user preference is not available, determine the disambiguated input based on at least one of the structural knowledge, the location of the user, and the time of the input.

17. The system of claim 11, wherein the control circuitry configured to determining the disambiguated input is further configured to determine the disambiguated input based on user history.

18. The system of claim 11, wherein the subset of content items comprises episodes of a series, and wherein the control circuitry configured to select the subset of content items is further configured to select a second episode of the series that follows a first episode of the series that the user most recently watched.

19. The system of claim 11, wherein the subset of content items comprises at least one location, and wherein the control circuitry is further configured to display the at least one location on a map.

20. The system of claim 11, wherein the control circuitry configured to select the subset of content items from the set of content items based on comparing the disambiguated input with the metadata describing each respective content item of the set of content items is further configured to:
determine, based on the comparing, that no content items in the set of content items satisfy the disambiguated input; and;
select a subset of content items that satisfies a portion of the disambiguated input.

\* \* \* \* \*